US010475265B2

(12) United States Patent
Fabre (10) Patent No.: US 10,475,265 B2
(45) Date of Patent: Nov. 12, 2019

(54) MODULAR LOCKER AND METHOD FOR LOCKING/UNLOCKING AT LEAST TWO DOORS OF SUCH A LOCKER

(71) Applicant: LA POSTE, Paris (FR)

(72) Inventor: Jean-Paul Fabre, Paris (FR)

(73) Assignee: LA POSTE, Paris (FR)

( * ) Notice: Subject to any disclaimer, the term of this patent is extended or adjusted under 35 U.S.C. 154(b) by 0 days.

(21) Appl. No.: 16/117,171

(22) Filed: Aug. 30, 2018

(65) Prior Publication Data

US 2019/0066418 A1 Feb. 28, 2019

(30) Foreign Application Priority Data

Aug. 30, 2017 (FR) ...................................... 17 58014

(51) Int. Cl.
*G07C 9/00* (2006.01)
*E05G 1/08* (2006.01)
*G06Q 10/08* (2012.01)

(52) U.S. Cl.
CPC ........... *G07C 9/00182* (2013.01); *E05G 1/08* (2013.01); *G06Q 10/083* (2013.01); *G07C 9/00912* (2013.01); *G07C 2009/00793* (2013.01)

(58) Field of Classification Search
None
See application file for complete search history.

(56) References Cited

U.S. PATENT DOCUMENTS

2008/0061924 A1 3/2008 Labowicz et al.
2009/0187274 A1 7/2009 Higham

FOREIGN PATENT DOCUMENTS

| GB | 2430705 A | * | 4/2007 | |
|---|---|---|---|---|
| WO | WO-0115579 A1 | * | 3/2001 | ......... A47G 29/1201 |
| WO | 2014078860 A1 | | 5/2014 | |

OTHER PUBLICATIONS

Foreign Communication from a Related Counterpart Application, Preliminary Search Report dated May 14, 2018, French Application No. 1758014 filed on Aug. 30, 2017.

* cited by examiner

*Primary Examiner* — Daniell L Negron (57) ABSTRACT

The invention relates to a locker comprising compartments; one/more compartment separator(s) which could take a first position, so as to separate the compartments, or a second position, so as to assemble the compartments; doors forming access to the compartments, and electronic locks which can lock or unlock the doors according to the value of an instruction; a control module linked to the electronic locks; means for receiving and authenticating a digital key and for generating an instruction signal; means for determining the positions of the separator(s); when it is determined that the compartment separator(s) is/are positioned in the second position, following the authentication of the digital key, the instruction signal is transmitted to all the electronic locks associated with the doors which form access to the compartments arranged on either side of the compartment separator(s), for the locking or unlocking of said doors.

11 Claims, 5 Drawing Sheets

MODULAR LOCKER AND METHOD FOR LOCKING/UNLOCKING AT LEAST TWO DOORS OF SUCH A LOCKER

CROSS-REFERENCE TO RELATED APPLICATIONS

The present application claims priority to French Application No. 1758014 filed with the Intellectual Property Office of France on Aug. 30, 2017 and entitled "MODULAR LOCKER, AND METHOD FOR LOCKING/UNLOCKING AT LEAST TWO DOORS OF SUCH A LOCKER," which is incorporated herein by reference in their entirety for all purposes.

TECHNICAL FIELD OF THE INVENTION

The present invention generally relates to the field of storage lockers, and more specifically, storage lockers comprising compartments for receiving objects, as well as secure access to the compartments of the lockers.

PRIOR ART

A locker comprising compartments for receiving objects and doors forming access to the compartments from the outside is known. The locker further comprises devices for locking and unlocking each door. The unlocking devices comprise, in particular, means for acquiring data, for example enabling to input an alphanumerical code by a user to lead to the locking or the unlocking of each door. A problem encountered in such devices, further to the limiting aspect of adapting the size of the compartments to the size of the objects to be received, is the manual inputting of the mentioned alphanumeric codes.

SUMMARY OF THE INVENTION

The invention subsequently defined aims to overcome all or part of the disadvantages of the state of the art and in particular, to propose a modular locker enabling to adapt the space for receiving objects according to the size thereof, by separating or by assembling the internal spaces of the compartments, by securing access to the compartments from one or more digital key(s) and, if several compartments are assembled, by managing the coordinated locking or unlocking of the doors forming access to the assembled compartments.

To this end, the invention proposes a locker comprising: at least two compartments, each defining an internal space for receiving an object; at least one compartment separator arranged between two compartments and which could be positioned in a first position, so as to separate the respective internal spaces defined by these compartments, or in a second position, so as to assemble the respective internal spaces defined by these compartments; at least two doors, each door forming access to a separate compartment from the outside of the locker, each door comprising an electronic lock and being capable of closing one of said internal spaces; and a control module linked to the electronic locks via a datalink, the electronic locks comprising the motor means capable of locking and unlocking the door according to the value of an instruction received by the electronic locks via the first datalink, the control module comprising means for receiving a signal comprising at least one digital key, referred to as received digital key; and an electronic recognition component enabling to authenticate said at least one received digital key, the receiving means being able to transmit the signal to the electronic recognition component, the authentication of said at least one received digital key by the electronic recognition component triggering the generation of an instruction signal for the locking or the unlocking of the door. The control module further comprises means for determining if the at least one compartment separator is positioned in the first or in the second position, and the means for transmitting the result of this determination to the electronic recognition component; the electronic recognition component is capable, when it is determined that said at least one compartment separator is positioned in the second position, to transmit, following the authentication of said at least one digital key, said instruction signal for all the electronic locks associated with the doors which form access to the compartments arranged on either side of said at least one compartment separator, for the locking or the unlocking of said doors.

This enables, in case of assembling at least two locker compartments, to facilitate access to the inside of the resulting compartment, via the simultaneous opening of all doors which form access to this compartment, while enabling to ensure a simple and reliable management of the digital keys generated.

The invention can have one or more of the following characteristics:

In an embodiment, the locker further comprises motor means capable of positioning said at least one compartment separator in the first or in the second position, according to the value of at least one control signal received, the control module capable of receiving a positioning order from the at least one compartment separator, the control module being able to generate said at least one control signal according to the positioning order received and to transmit to the motor means, said at least one control signal for the positioning of said at least one compartment separator in the first or in the second position.

In an embodiment, the locker further comprises at least one detector capable of detecting if said at least one compartment separator is located in the first or in the second position, said at least one detector being connected by a connection to the control module, and capable of transmitting to the control module, the information representative of the positioning of said at least one compartment separator.

In an embodiment of the locker, said at least one compartment separator can be manually positioned by a user equipped with a communication device, enabling a manual inputting of the information representative of the positioning of said at least one compartment separator, the communication device being capable of transmitting this information to the control module.

In an embodiment of the locker, the electronic locks comprise means for detecting a closing of the door and the means for emitting a signal for detecting closing on the datalink and the control module further comprises means for generating digital keys able to generating a unique digital key following the detection of closing of the door, the means for transmitting the unique digital key generated to the electronic recognition component, the electronic component being specific to authenticating the received digital key by comparing with the digital key generated and the means for emitting a signal comprising the unique digital key generated.

In another embodiment of the locker, the means for generating digital keys are capable, when said at least one compartment separator is positioned in the second position, of generating a unique digital key for all electronic locks associated with the doors which form access to the compartments arranged on either side of said at least one compartment separator, the unique digital key only being generated when the closing of all doors which form access to the compartments arranged on either side of said at least one compartment separator is detected.

In a preferred embodiment, the locker further comprises a module for storing digital keys, at least one digital key being associated with each electronic lock and means for transmitting, from said at least one stored unique digital key, to the electronic recognition component, the electronic component being able to authenticate said at least one received digital key by comparing with said at least one stored digital key.

In an embodiment of the locker, a timestamp is associated with the unique digital key, and the electronic component is only able to authenticating the received digital key by comparing with the unique digital key generated for a predetermined duration.

Another aim of the invention is a vehicle comprising a locker such as defined above.

Another aim of the invention is a furniture unit comprising a locker such as defined above.

According to another aspect, the invention also aims for a method for locking or unlocking at least two doors of a locker such as defined above. More specifically, the locking and unlocking method comprises:
- a step of receiving by the receiving means of the control module, a signal comprising at least one digital key, said received digital key;
- a step of authenticating said at least one received digital key by the electronic recognition component;
- a step of determining, by the control module, if the at least one compartment separator is positioned in the first or in the second position;
- a step of transmitting, by the control module, the result of this determination to the electronic recognition component and, when it is determined that said at least one compartment separator is positioned in the second position,
- a step of generating by the electronic recognition component, following the authentication of said at least one digital key, an instruction signal for all electronic locks associated with the doors which form access to the compartments arranged on either side of said at least one compartment separator (16, 16A, 16B), for the locking or unlocking of said doors.

BRIEF DESCRIPTION OF THE FIGURES

Other characteristics and advantages of the invention will emerge upon reading the description which follows, given only as an example, and made in reference to FIGS. 1 to 7.

DETAILED DESCRIPTION OF AN EMBODIMENT

In the following description, "door", means any mechanical element, mobile between a closing position forbidding access to the inside of a compartment of a locker, and an opening position enabling access to the inside of the compartment.

Also, "communication device", means any roaming electronic device capable of transmitting and receiving data via a network or a wireless network portion, such as for example a laptop, a telephone, a smartphone, or a digital tablet, this list being not exhaustive.

In reference to FIGS. 1 to 7, a locker 1 comprises at least two compartments 10, 10A, 10B, 10C, each equipped with doors 12, 12A, 12B, 12C and a device 14 enabling the locking and unlocking of each door 12, 12A, 12B, 12C, referred to as unlocking device.

Each compartment 10, 10A, 10B, 10C defines an internal space 24A, 24B, 24C for receiving an object. Such an object, which is not represented in the figures for reasons of clarity, is for example intended to be distributed to an end user, or sent by this user, using a collection and distribution service, ensured by the operator of the locker 1.

Each door 12A, 12B, 12C forms access to one of the compartments 10A, 10B, 10C from the outside of the locker 1, and is capable of closing the internal space 24A, 24B, 24C associated with this compartment. In the example of a specific embodiment in FIGS. 1 to 5, each door 12A, 12B, 12C is formed from an upper door 26A, 26B, 26C pivoting around an axis A-A, such a door forming access to an internal space 24A, 24B, 24C.

Alternatively, the doors 12A, 12B, 12C can be formed by side doors, disposed vertically. This arrangement (not represented) enables to stack the modular lockers, while keeping the possibility to access the internal space of the compartments 10A, 10B, 10C.

Each door 26A, 26B, 26C can be equipped with a gripping handle 28 facilitating the opening thereof by a user.

Figure 3:
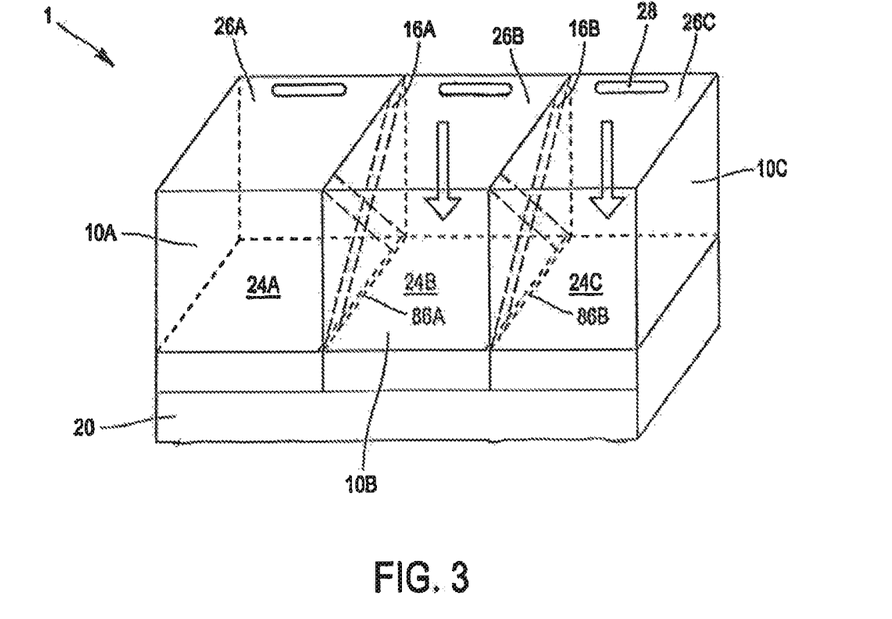
FIG. 3 is a view, similar to that in FIG. 1, wherein the compartment separators are in a first position, enabling to separate the internal spaces of the compartments.
Figure 4:
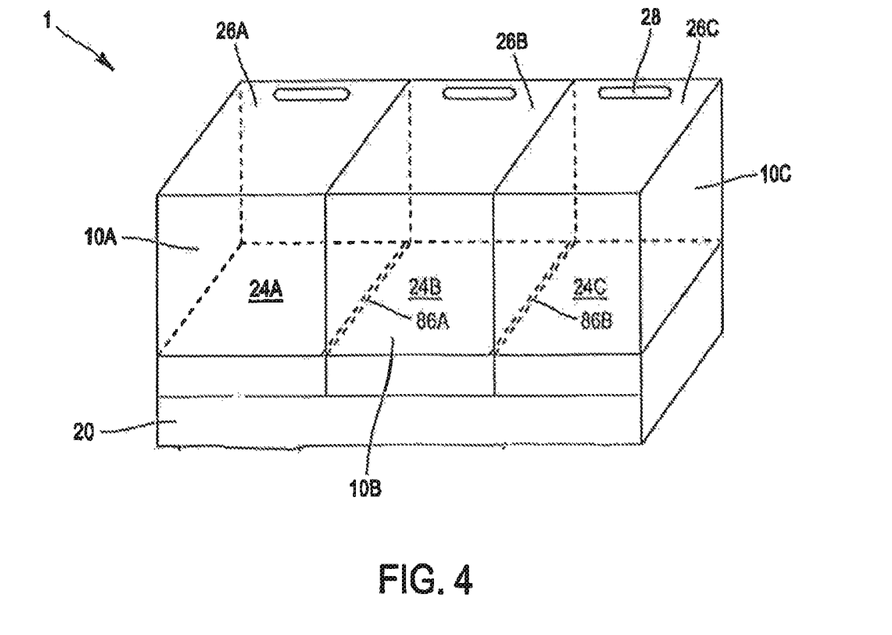
FIG. 4 is a view, similar to that in FIG. 1, wherein the compartment separators are in a second position, enabling to assemble the internal spaces of the compartments.

The locker 1 comprises at least one compartment separator 16, 16A, 16B, which could be positioned in a first position, illustrated in FIG. 3, so as to separate the respective internal spaces 24A, 24B, 24C defined by these compartments 10, 10A, 10B, 10C, or in a second position, illustrated in FIG. 4, so as to assemble the respective internal spaces 24A, 24B, 24C defined by these compartments 10, 10A, 10B, 10C.

In an embodiment, the locker also comprises motor means 18A, 18B, linked to the separators 16A, 16B, and capable of positioning these separators in the first position or in the second position. In the example illustrated, each compartment separator 16A, 16B is retractable, mobile between a first non-retracted position, represented in FIG. 3, and a second retracted position, represented in FIG. 4. The first separator 16A separates, in the non-retracted position, the internal spaces 24A, 24B defined by the first and second compartments 10A, 10B. The second separator 16B separates, in the non-retracted position, the internal spaces 24B, 24C defined by the second compartment 10B and by a third compartment 10C.

Each retractable separator 16A, 16B, is capable of being retracted in a chassis 20, through a slot 86A, 86B provided for this purpose in the chassis 20.

The motor means 18 of each compartment separator 16A, 16B are capable of retracting and replacing in the non-retracted position the separator 16A, 16B, according to the value of a control signal 84A, 84B. The motor means 18 of each separator 16A, 16B are, for example, formed from a micromotor enabling to move the separator between the first non-retracted position thereof and the second retracted position thereof, and vice versa, according to the value of the control signal 84A, 84B received.

An example of an embodiment of the unlocking device 14 will now be described in reference to FIGS. 1 and 2.

The unlocking device 14 comprises at least two electronic locks 34A, 34B, 34C and a control module 36 linked to each electronic lock via a datalink 38A, 38B, 38C. Each electronic lock 34A, 34B, 34C is capable of locking and unlocking one of the doors 12A, 12B, 12C.

Figure 1:
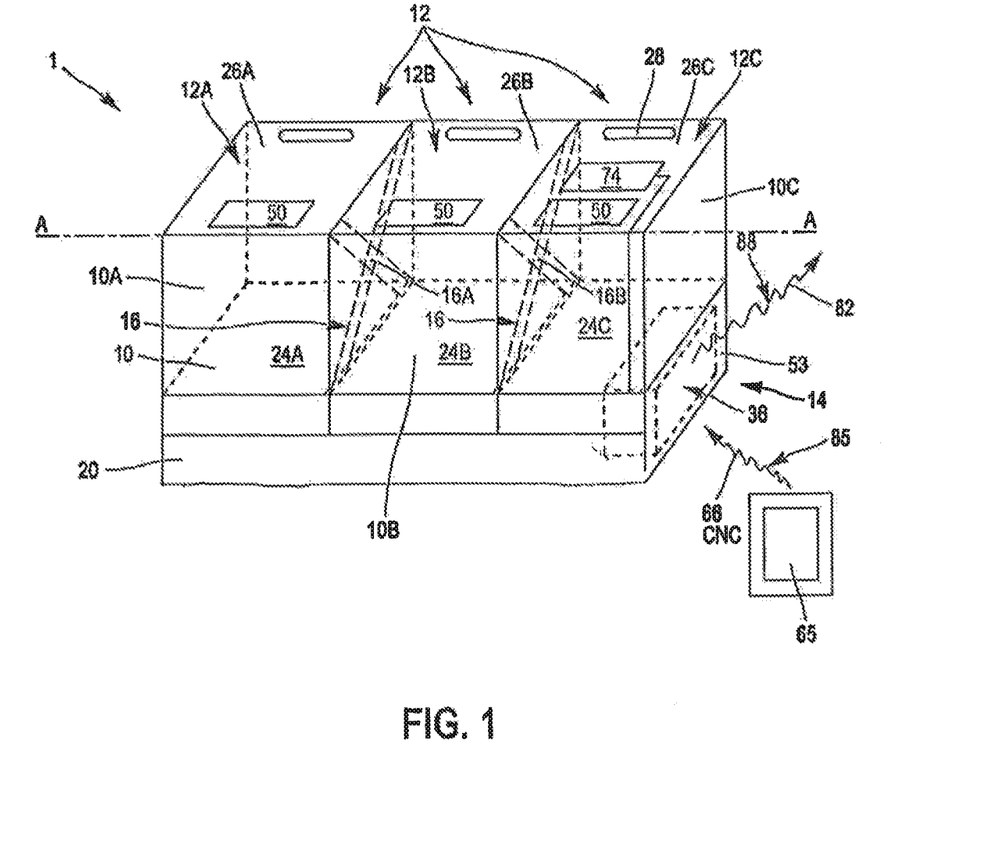
FIG. 1 is a perspective view of a locker according to an embodiment of the invention.

The control module 36 is, for example, arranged under a compartment 10C, in a housing 53 arranged for this purpose within the chassis 20, as illustrated in FIG. 1.

Figure 2:
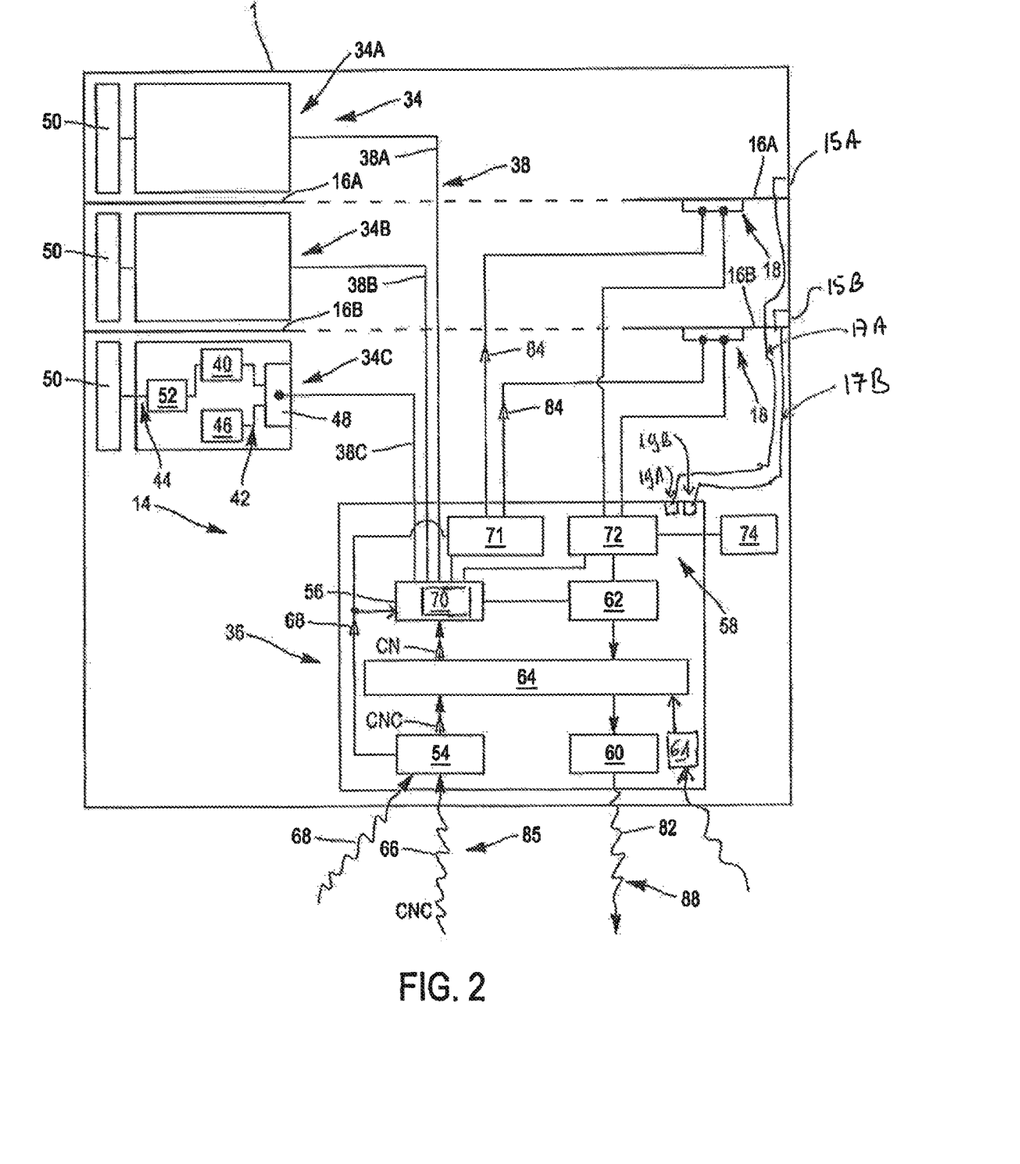
FIG. 2 is a schematic representation of the elements belonging to the locker in FIG. 1.

In this embodiment, each electronic lock 34A, 34B, 34C comprises the motor means 40 and the means 42 for detecting a closing of the associated door 12A, 12B, 12C, as represented in FIG. 2. The motor means 40 are capable of locking or unlocking the door 12A, 12B, 12C, according to the value of an instruction received via the datalink 38A, 38B, 38C; in certain embodiments, the motor means 40 are also capable of locking the door 12A, 12B, 12C, during the detection of the closing of this door by the detection means 42.

In certain embodiments, the detection means 42 are capable of emitting a signal for detecting the closing of the door 12A, 12B, 12C associated with the lock, on the associated datalink 38A, 38B, 38C. In the example of an embodiment in FIG. 2, the detection means 42 comprise a movement sensor 46 capable of detecting a closing of the door 12A, 12B, 12C, and a data transceiver 48 linked to the movement sensor 46 and to the associated datalink 38A, 38B, 38C. The transceiver 48 is further connected to the motor means 40.

The control module 36 comprises a signal sensor 54 comprising, for example, a radiofrequency receiver, able to receiving a frequency signal which could be used for communications over telecommunications networks, for example LTE, Wi-Fi, Bluetooth, BLE (Bluetooth Low Energy), NFC (Near Field Technology), or Zigbee type. Such a sensor can establish, in certain embodiments, two-directional communications with a communication device 65, 65', of a user.

In certain embodiments, the control module 36 further comprises means 60 for emitting signals, and means 61 for receiving signals, for a one-directional or two-directional communication with a data storage server, for example via a network of a telecommunication operator and/or via a private network of the operator of the locker 1.

The control module 36 further comprises an electronic component 56, linked to the sensor 54 and to each datalink 38A, 38B, 38C, and means 62 for generating digital keys, linked to the electronic component 56 and to the emission means 60. Preferably, the control module 36 also comprises a data coding/decoding component 64.

In a specific embodiment, the control module 36 also comprises a unit 71 for controlling the motor means 18 of the retractable separators 16A, 16B, linked to these motor means 18.

The control module also comprises electrical supply means, for example an element for storing electrical energy 72 and an element 74 for converting energy linked to the element for storing electrical energy 72.

The sensor 54 is able of receiving a signal 66 comprising a digital key CN, CNC, emitted by a communication device 65 disposed close to the control module 36. The sensor 54 is capable of transmitting this signal 66 to the electronic component 56.

The electronic component 56 is an electronic recognition component enabling to authenticate a digital key CN received via the signal 66. The electronic component 56 is able, when it authenticates the received digital key CN, to generating an instruction signal for activating or deactivating the motor means 40, for the locking or unlocking of the doors 12A, 12B, 12C, and to emitting this signal on the corresponding datalink 38A, 38B, 38C.

In a specific embodiment, the means 62 for generating digital keys are able to generating a unique digital key at each closing of at least one of the doors 12A, 12B, 12C, the emission means 60 being able to emitting a signal 82 comprising the digital key generated. More specifically, the generation means 62 are able to generating a unique digital key following the receiving by the electronic component 56 of at least one signal for detecting closing of a door 12A, 12B, 12C. The generation means 62 are also able to transmitting each digital key generated to the electronic component 56, for storage in the memory thereof, thus enabling a later authentication of a digital key CN received by comparing with the digital key generated. More specifically, the electronic component 56 is only able to authenticating a digital key CN received by comparing with the last digital key generated following the closing of at least one of the doors 12A, 12B, 12C.

Preferably, the means 62 for generating digital keys are able to generating a unique digital key following the receiving by the control module 36 of an order to generate digital keys. This order can be received via the sensor 54, for example in the case of emission of the order by a communication device 65 of an authorized agent of the operator of the locker 1. The signal used will be, in this case, Bluetooth, BLE (Bluetooth Low Energy), or NFC type signals.

In a variant, the order to generate digital keys can be received by the control module 36 by way of the receiving means 61, via the private network of the operator of the locker 1, for example from the data storage server of the operator.

In both cases, the control module 36 is able to sending to the data storage server of the operator, a signal 82 comprising the digital key(s) generated, either by way of the emission means 60, or by way of the communication device 65 of an authorized agent.

According to an embodiment of the invention, the electronic component 56 comprises, in the memory thereof, the digital keys recorded during the production of the locker. These keys are generated by specialized means. Then, all the keys and identifiers of the locks associated with these keys are sent, by way of secured means, to the data storage server of the operator of the locker 1. The keys generated corresponding to the locks 34, 34A, 34B, 34C of a locker 1 conforms with this embodiment, are recorded in the memory of the electronic recognition component 56.

Preferably, the processor of the electronic component 56 is able to replacing in the memory of the electronic component 56, a digital key already stored, by a digital key newly received by way of the receiving means 54, 61, or newly generated, following the detection of the closing of at least one of the doors 12A, 12B, 12C, or following the receiving of an order to generate a new digital key. This enables to advantageously reduce the memory space necessary for storing digital keys in the memory of the electronic component 56.

It must be noted, that the different methods of generating digital keys defined above are not exclusive, which enables a similar functioning for controlling all the electronic locks, and thus simplifying the management of the keys, in particular within the data storage server of the operator of the locker 1. As in the cases of generating digital keys, either following the detection of closing of a door, or following the receiving of an order to generate a digital key, the keys generated are transmitted via the emission means 60 to the data storage server, the latter can maintain a database comprising the applicable digital keys, in other words, either the original keys, recorded during the production of the lockers, or the generated keys which would have replaced the original keys.

In the case where the digital keys are stored in the memory of the electronic recognition component 56, if they are not regenerated and replaced, one same key can be used several times for the same lock. To avoid a fraudulent use of a key, for example, in case of theft of a unique digital key after it has been emitted by the communication device 65 of the user, or by the emission means 60, the keys will be transmitted in encrypted form, according to a technique known by a person skilled in the art, under the name, "salt grain". A timestamp is integrated to the encrypted data, in addition to the key to be transmitted. Using this technique, if a malicious user captures the key and changes the timestamp, the encrypted information will not match, and the captured key will be rejected by the control module 36. The fraud attempt thus detected will be transmitted by the control module 36 to the data server of the operator of the locker.

The generation means 62 are, for example, formed from a software module for generating unique digital keys.

In the preferred embodiment, according to which the electronic component 56 also comprises an electronic clock 70, a timestamp is associated with the unique digital key generated and the electronic component 56 is only able to authenticating a digital key CN received by comparing with the digital key generated for a predetermined duration. This enables, in case of theft of a unique digital key after it has been emitted by the control module 36, to reduce the duration of a "fictive" time window, during which access to the internal space of one or more compartment(s) can be compromised. Additional security is thus obtained.

The data coding component 64 is connected, on the one hand, between the sensor 54 and the electronic component 56, and on the other hand, between the means 62 for generating digital keys and the means 60 for emitting signals. The coding component 64 is able to coding unique digital keys generated by the generation means 62.

The coding component 64 is further able to decoding a coded digital key CNC contained in the signal 66 and to transmitting the decoded digital key CN to the electronic component 56.

Preferably, the coding component 64 is also able to transmitting coded digital keys to the emission means 60, after receiving by the electronic component 56 of a locking confirmation signal from at least one of the doors 12A, 12B, 12C, followed by a generation of new digital keys by the means 62 for generating digital keys. In a variant, the coding component 64 is able to transmitting to the emission means 60, coded digital keys CNC corresponding to the new digital keys CN generated according to one of the generation variants defined above. In both cases, the signal 82 comprises coded digital keys CNC, for transmission to the data storage server.

Each datalink 38A, 38B, 38C can be a wire or wireless two-directional link. In the embodiment of the invention in FIGS. 1 and 2, each datalink 38A, 38B, 38C is, for example, a two-directional radioelectric link. In a variant, the datalink 38A, 38B, 38C is a two-directional point-to-multipoint link. Again, in a variant, the datalink 38A, 38B, 38C can be one-directional, enabling a transmission by the control module 36 of the instruction signals for activating or deactivating the motor means 40, for the locking or unlocking of the doors 12A, 12B, 12C.

In certain embodiments, according to which the compartment separators are retractable, the sensor 54 or the receiving means 61 are further able to receiving a control signal 68 for moving at least one of these retractable separators 16A, 16B. The sensor 54 or the receiving means 61 are capable of transmitting this control signal 68 to the unit 71 for controlling the motor means 18 of the separators. The unit 71 for controlling the motor means 18 is able, following the receiving of the movement control signal 68, to transmitting to the associated motor means 18, a control signal 84 for the retraction or the replacement of this separator.

In certain embodiments, the locker 1 further comprises at least one detector 15A, 15B, capable of detecting if said at least one compartment separator 16A, 16B is located in the first or in the second position, said at least one detector being connected by a connection 17A, 17B, to the control module 36, and capable of transmitting to it, by way of this connection 17A, 17B, the information representative of the positioning of said at least one compartment separator 16A, 16B. The control module 36 is capable of transmitting this information to the communication device 65, 65' by way of the sensor 54, using for example a BLE technology, and/or to the data storage server, by way of the emission means 61 of the communication device 65.

A user of a locker such as defined above is equipped with a communication device 65, 65' capable of emitting, over a wireless link 85, the signal 66 comprising a coded digital key CNC or non-coded digital key CN.

In certain embodiments, the communication device 65 of the user is equipped with an MMI inputting interface, for example a touchscreen, enabling a manual inputting of information representative of the positioning of the compartment separators 16, 16A, 16B; the communication device can also be equipped with capture means enabling the acquisition of such information.

The communication device 65, 65' is capable of transmitting this information to the control module 36 and/or to the data storage server. This configuration is particularly useful in the case of a locker wherein at least one compartment separator 16, 16A, 16B can be positioned manually by the user of the communication device 65, 65'.

Figure 5:
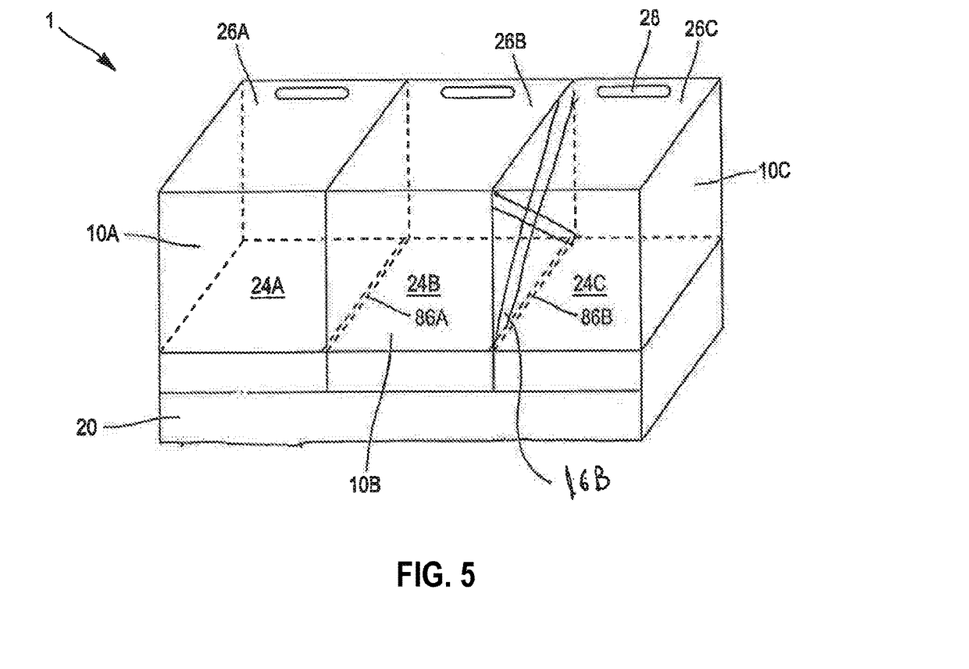
FIG. 5 is a view, similar to that in FIG. 1, wherein a compartment separator is in the first position enabling to separate the internal spaces of the compartments, and a compartment separator is in the second position enabling to assemble the internal spaces of the compartments.

A first functioning method of the locker 1 in a specific embodiment will now be defined in reference to FIG. 5.

In a locker 1 implementing this first functioning method, each compartment separator is a retractable separator 16A, 16B, mobile between a first non-retracted position, and a second retracted position, as explained above. The locker 1 has motor means 18A, 18B, linked to the separators 16A, 16B, and capable of positioning these separators in the first position or in the second position, as well as a unit 71 for controlling the motor means 18.

It is assumed that the initial configuration of the locker 1 is that represented in FIG. 5, namely with the separator 16B in the first non-retracted position, and with the separator 16A (not represented in this figure) in the second position, retracted, so as to assemble the internal spaces 24A, 24B defined by the compartments 10A and 10B.

This configuration is obtained in a preliminary step, during which a "distributor" user sends from an external communication device 65, a signal 68 comprising an order for positioning of the separator 16A in the second position, in other words, in a retracted position and of the separator 16B in the first position, in other words, in a non-retracted position. This control signal 68 is received by the control module 36 via the sensor 54.

In a variant, the control module 36 can receive such an order for positioning the compartment separators by way of the receiving means 61, via the private network of the operator of the locker 1, for example from the data storage server of the operator.

This control signal 68 corresponds to an order for assembling the first and second compartments 10A, 10B. The sensor 54 thus transmits this control signal 68 to the unit 71 for controlling the motor means 18 of the separators.

The method then comprises a step of emitting a control signal 84 for retracting the first separator 16A, addressed to the motor means 18 linked to the first separator 16A. The control signal 84 is emitted by the control unit 71. The first separator 16A is thus moved from the non-retracted position thereof to the retracted position thereof by the associated motor means 18.

The control module 36 also comprises means 55 for memorizing the sent control signal 84, which will subsequently enable it to determine the respective positions of the compartment separators 16A and 16B.

Then, it is assumed that the "distributor" user places, within the space formed by the assembling of the internal spaces 24A and 24B, an object to distribute, intended for the user of a communication device 65', hereafter called "recipient". More specifically, the "distributor" user places the object to distribute in the first and second compartments 10A, 10B, then closes the first and second associated doors 12A, 12B.

The object to distribute is, for example, a package. The detection means 42 arranged within the corresponding electronic locks 34A, 34B detect the closing of the doors 12A, 12B, and emit a detecting signal for signaling the closing of these doors on the associated datalinks 38A, 38B.

During a following step, the electronic recognition component 56 receives detecting signals for signaling closing of the doors 12A and 12B. Optionally, the method loops over this step as the electronic recognition component 56 has not received all the closing signals associated with all the doors which form access to the compartments arranged on either side of the retracted separator(s).

After receiving all the expected closing signals, the electronic component 56 generates instruction signals for activating the motor means 40 for locking the doors 12A and 12B, and emits these signals on the associated datalinks 38A, 38B. After receiving by the electronic locks 34A, 34B of the instruction signal for activating the motor means, the motor means 40 lock the doors 12A, 12B.

During a following step, the generation means 62 generate a unique digital key CN_A, CN_B for each electronic lock 34B, 34C. The generation means 62 transmit these digital keys CN_A, CN_B, to the electronic recognition component 56 and to the coding component 64. Alternatively, one single digital key CN_AB is generated for the two electronic locks 34A, 34B. This digital key CN_AB common to the two electronic locks 34A, 34B, is then transmitted by the generation means 62 to the electronic recognition component 56 and to the coding component 64.

During a following step, the electronic component 56 stores the digital keys CN_A, CN_B, CN_AB in the memory thereof. Preferably, during this same step, the coding component 64 codes these digital keys and thus obtains the coded digital keys CNC_A, CNC_B, CNC_AB.

Preferably, during a following step, the "distributor" user transmits to the sensor 54, for example via the communication device 65 thereof, a signal for confirming the locking of the doors 12A and 12B. Following the receiving of the confirmation signal by the electronic component 56 via the sensor 54, the electronic component 56 transmits to the coding component 64, an instruction signal of transmitting the coded digital keys CNC_A, CNC_B, CNC_AB, to the emission means 60. From this step, the coding component 64 transmits the coded digital keys to the emission means 60 of the control module 36. The emission means 60 thus emit the signal 82 comprising the coded digital keys CNC_A, CNC_B, CNC_AB, on the datalink 88, for example for a data storage server of the operator.

Optionally, the signal 82 can also comprise information representative of the positions of the compartment separators 16A and 16B. As a reminder, this information can be obtained by the control module 36 using the means 55 for memorizing the signals 84A, 84B, previously sent to the motor means 18 associated with the separators.

It is subsequently assumed that a "recipient" user is moved up to the locker 1 to recover the object to distribute; and that this user is alerted of the availability of the package, for example via a notification on the communication device 65' thereof. It is further assumed that the "recipient" user receives, on the communication device 65' thereof, the coded digital key(s) CNC_A, CNC_B, CNC_AB, from the data storage server of the operator of the locker 1. It is finally assumed that the "recipient" user goes close to the locker 1, then he inputs, via a man-machine interface of this communication device 65', an instruction for sending the coded digital key(s) CNC_A, CNC_B, CNC_AB by the communication device 65' thereof, to the control module 36. The communication device 65' thus emits the signal 66 containing the coded digital key(s) CNC_A, CNC_B, CNC_AB on the wireless link 85, addressed to the control module 36.

During a following step, the sensor 54 receives the signal 66 containing the coded digital key CNC, CNC_A, CNC_B, CNC_AB. The sensor 54 thus transmits the coded digital key(s) CNC_A, CNC_B, CNC_AB to the coding component 64. Then, the coding component 64 decodes the coded digital key(s) CNC, CNC_A, CNC_B, CNC_AB, then transmits the obtained digital key(s) CN, CN_A, CN_B, CN_AB to the electronic recognition component 56.

During a following step, the electronic recognition component 56 authenticates the received digital key(s) CN, CN_A, CN_B, CN_AB, by comparing with the digital keys previously stored within the memory thereof. Then, the electronic recognition component 56 identifies the electronic lock(s) corresponding to the authenticated key(s), as well as the doors associated with these locks, then the compartments to which these doors give access, and finally the separators likely to define, in a non-retracted position, the internal spaces specific to these compartments.

The control module 36 then determines, using the means for memorizing the orders for positioning the compartment separators previously sent, if among the identified separators, there are separators in a retracted position, in this example, the separator 16A. The control module 36 then generates a deactivation instruction signal for the motor means 40 of the electronic locks 34A and 34B, associated with the doors 12A, 12B which form access to the space formed by assembling the compartments 10A and 10B, arranged on either side of the separator 16A being located in a retracted position.

According to the embodiments, the electronic recognition component 56 generates the instruction signal if at least one of the digital keys received corresponds to one of the digital keys stored and associated with the electronic locks 34A and 34B, or if all the digital keys received correspond to the digital keys stored and associated with the electronic locks 34A and 34B.

The electronic recognition component 56 then emits this deactivation instruction signal on the corresponding datalinks 38A, 38B. After receiving by the electronic locks 34A, 34B of the instruction signal for deactivating the motor means, the motor means 40 unlock the doors 12A, 12B, thus freeing access to the space formed by assembling the internal spaces 24A, 24B of the compartments 10A and 10B. The instruction signals for deactivating the motor means 40 of the electronic locks 34A and 34B are sent coordinated, simultaneously or almost simultaneously, for an unlocking of these locks which will be perceived by the "recipient" user as simultaneous.

From this step, the "recipient" user can open the doors 12A and 12B, then recover the object inside the assembled compartments 10A, 10B.

A second functioning method of the locker 1 will now be defined, in reference to the same FIG. 5. This second functioning method is similar to the first functioning method, except for the method for generating keys.

In this functioning method, during the production of the lockers, the digital keys associated with each lock are stored in the non-volatile memory of the recognition component 56. The control module 36 further comprises the means 62 for generating digital keys which are able to generating a unique digital key following the receiving by the control module 36 of an order for generating digital keys. This order can be received via the sensor 54, for example in the case of emitting the order by a communication device 65 of an authorized agent of the operator of the locker 1. The signals used can be, in this case, LTE, Bluetooth, BLE (Bluetooth Low Energy), or NFC type signals. The order can also be received by way of the receiving means 61 of the control module.

In this second functioning method, the keys can be generated one by one, for example during the use of the locker by a client or agent user of the operator. Several keys can be generated at the same time, for example following a message distributed from the data server to all the lockers managed by this server, or to a subset of these lockers.

It must be noted, that the two methods for generating keys following the receiving of an order for generating key(s), one by one or several at the same time, can coexist on one same locker.

In this second functioning method of the locker 1, the keys stored in the memory of the electronic recognition component 56 are not regenerated and replaced at each closing of the doors. Consequently, one same key can be used several times for the same lock. As already mentioned, techniques known to a person skilled in the art, such as the "salt grain" technique, enable to avoid a fraudulent use of a key, for example in case of intercepting a signal carrying a digital key.

A third functioning method of the locker 1 will now be defined, in reference to the same FIG. 5. This third functioning method can be similar to the first or to the second functioning method, except for the method for positioning the compartment separators, and the way in which this positioning is determined by the control module 36.

In a locker 1 implementing this third functioning method, each compartment separator is a removable separator 16A, 16B, which could be positioned manually by a user, either in a first position, so as to separate the respective internal spaces 24A, 24B, 24C defined by the compartments 10A, 10B, 10C, or in a second position, so as to assemble the respective internal spaces 24A, 24B, 24C defined by these compartments 10A, 10B, 10C.

The locker 1 further comprises at least one detector 15A, 15B capable of detecting if said at least one compartment separator 16A, 16B is located in the first or in the second position, said at least one detector being connected by a connection 17A, 17B to the control module 36, and capable of transmitting to it, by way of this connection 17A, 17B, information representative of the positioning of said at least one compartment separator 16A, 16B.

The connection 17A, 17B can be simply constituted by electrical conductor capable of transmitting an electrical signal, for example, the voltage on a dedicated output of the sensor 15A, 15B, to a dedicated input 19A, 19B, of the control module 36, the electrical signal could take two distinct values, for example 0V or 3.3V, or more generally, a positive voltage, representative of the logical value "1". Each value corresponds to a position of the compartment separator. The control module 36 can, using this information received on the dedicated input 19A, 19B, determine if at least one compartment separator 16A, 16B is positioned in the first or in the second position.

This embodiment has the advantage of providing an automated and secured solution for managing digital keys and opening compartments of the locker, even in case of manual positioning of the separators.

It must be noted, that determining the positions of the separators according to this embodiment can also be used during a motorized positioning of the separators, which simplifies the determination method.

In a variant, the connection 17A, 17B can be a wired or radiofrequency data connection. In this case, the control module 36 can determine the position of the compartment separators using a data receiver, to receive data emitted by the position detectors 15A, 15B.

In both cases, using the result of determining the positions of the compartment separators is similar to that of the first functioning method. The control module 36 determines, using the information received by way of the connection 17, if among the identified separators, there are separators positioned in the second position, in this example, the separator 16A. Then, the control module 36 generates a deactivation instruction signal for the motor means 40 of the electronic locks 34A and 34B, associated with the doors 12A, 12B which form access to the space formed by the assembling of the compartments 10A and 10B, arranged on either side of the separator 16A located in the second position.

A fourth functioning method of the locker 1 will now be defined, in reference to the same FIG. 5. This fourth functioning method is similar to the first and second functioning methods defined above, except for the method for positioning the compartment separators, and the way in which the positions of separators are determined by the control module 36.

In a locker 1 implementing this fourth functioning method, each compartment separator is a removable separator 16A, 16B, which could be positioned manually by a user, either in a first position, so as to separate the respective internal spaces 24A, 24B, 24C defined by the compartments 10A, 10B, 10C, or in a second position, so as to assemble the respective internal spaces 24A, 24B, 24C defined by these compartments 10A, 10B, 10C.

For the implementation of this fourth functioning method, the "distributor" user which positions the compartment separators uses a communication device 65, 65', equipped with an MMI inputting interface, for example a touchscreen, enabling a manual inputting of information representative of the positioning of the compartment separators 16A, 16B, or capture means enabling the acquisition of such information. This communication device 65, 65' is also capable of transmitting this information to the control module 36 by way of the signal sensor 54 and/or to the data storage server, via a telecommunications network.

The control module 36 can thus, using the sensor 54, receive information relating to the positioning of the compartment separators, if this information is transmitted by the communication device 65 directly. Alternatively, if during the positioning of the separators, the information relating to the positions thereof is transmitted by the communication device 65 to the data server of the operator of the locker, the control module 36 can receive this information later, from the data server, for example via the receiving means 61.

It is thus conceived, that the method for simultaneously locking and unlocking (from the viewpoint of the user) of at least two doors of a locker according to the invention enables to assemble at least two compartments of the locker, so as to obtain a larger compartment, while facilitating access to the inside of the resulting compartment, via the simultaneous opening of all the doors which form access to this compartment, and by enabling to ensure a simple and reliable management of the digital keys generated.

The examples of functioning outlined illustrate cases of use, wherein the object received in the space formed by the assembled compartments is deposited by a user of the "distributor" locker, for example an agent of the operator of the locker 1, and then recovered by a "recipient" user, client of the operator. The "recipient" user obtains the unlocking of the locks in question, after having sent, via the communication device 65', the key(s) associated with these locks.

It is important to note, that the locker and the locking/unlocking method according to the invention can be used in use cases wherein the object is deposited by a "sender" user, client of the operator of the locker 1, and then collected by an agent user of the operator, in view of a later distribution. In this case, the "sender" user can deposit the object in a locker configured according to the size of this object, and obtain the locking of the locks in question, to secure the consignment thereof, after having transmitted, via the communication device 65, the key(s) associated with these locks.

Figure 6:
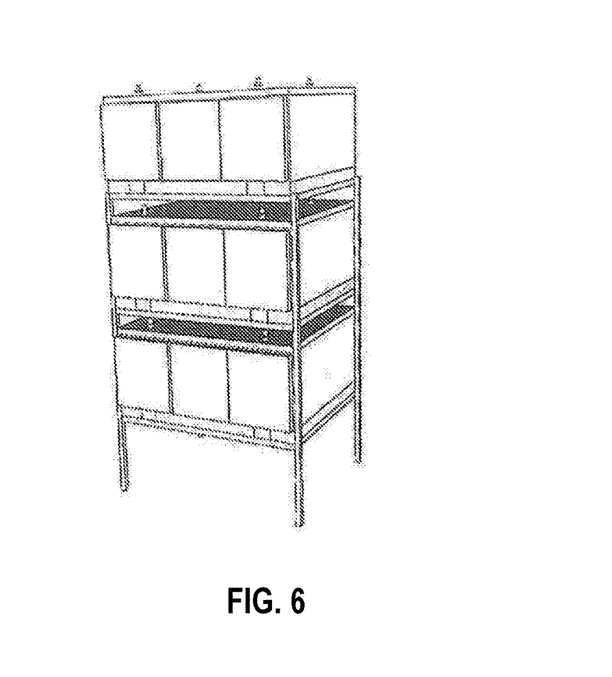
FIG. 6 represents a furniture unit comprising lockers according to an embodiment of the invention.
Figure 7:
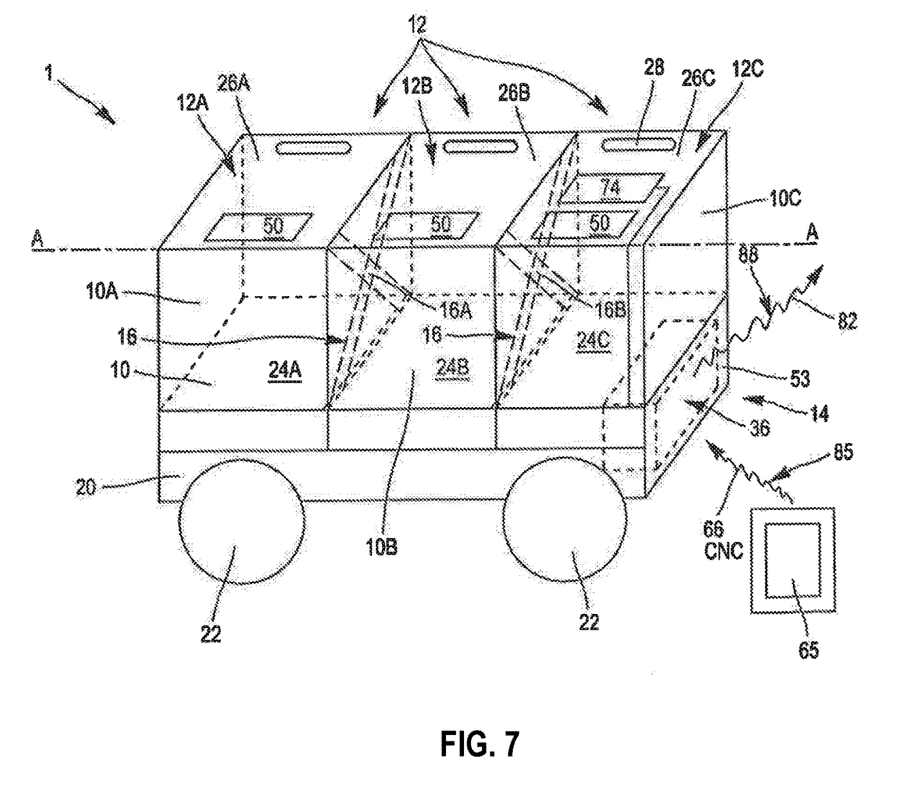
FIG. 7 represents a driverless vehicle comprising a locker according to an embodiment of the invention.

One or more lockers according to the invention can be attached to a furniture unit, for example a furniture unit referred to as "urban", installed in the road or in a building. Such a furniture unit is illustrated in FIG. 6.

One or more lockers according to the invention can be installed on a vehicle, with a driver or driverless, capable of moving on land, on water, or in the air. The invention is applied, for example, in the same way to a drone.

The lockers can be filled in advance and placed on the vehicle or on the furniture unit at the time of distribution. Modular lockers according to the invention are interchangeable, and the delivery is thus accelerated.

Several lockers according to the invention can be stacked, to obtain an optimized arrangement on a vehicle or in a furniture unit.

The lockers thus stacked can be rigidly connected by using an electronic lock of the same type as the electronic locks defined above. However, the locking and unlocking of the locks which rigidly connect the lockers according to the invention will be protected by dedicated digital keys, reserved for the use of agents of the operator of these lockers.

The invention is defined in the above as an example. It is understood that a person skilled in the art is quite capable of producing different variants of embodiments of the invention without moving away from the scope of the invention.

The invention claimed is:

1. A Locker comprising:
at least two compartments each defining an internal space for receiving an object;
at least one compartment separator arranged between two compartments and which could be positioned,
in a first position, so as to separate the respective internal spaces defined by these compartments, or
in a second position, so as to assemble the respective internal spaces defined by these compartments;
at least two doors, each door forming access to a separate compartment from the outside of the locker, each door comprising an electronic lock and being capable of closing one of said internal spaces; and
a control module linked to the electronic locks via a datalink, the electronic locks being capable of locking and unlocking the door according to the value of an instruction received by the electronic locks via the first datalink, the control module comprising;
a sensor capable of receiving a signal comprising at least one digital key; and
an electronic recognition component comprising a memory and a processor capable of authenticating said at least one received digital key,
the sensor being capable of transmitting the signal to the electronic recognition component, the authentication of said at least one received digital key by the electronic recognition component triggering the generation of an instruction signal for the locking or unlocking of the door, characterized in that,
the control module is configured to determine if the at least one compartment separator is positioned in the first or in the second position, and transmit the result of this determination to the electronic recognition component and in that,
the electronic recognition component is capable, when it is determined that said at least one compartment separator is positioned in the second position, to transmit, following the authentication of said at least one digital key, said instruction signal to all electronic locks associated with the doors which form access to the compartments arranged on either side of said at least one compartment separator, for the locking or unlocking of said doors.

2. Locker according to claim 1 further comprising a motor capable of positioning said at least one compartment separator in the first or in the second position, according to the value of at least one received control signal, the control module capable of receiving an order for positioning the at least one compartment separator, the control module being able to generate said at least one control signal according to the received order for positioning, and to transmit to the motor said at least one control signal for the positioning of said at least one compartment separator in the first or in the second position.

3. Locker according to claim 1, further comprising at least one sensor capable of detecting if said at least one compartment separator is located in the first or in the second position, said at least one sensor being connected by a connection to the control module, and capable of transmitting to the control module, informations representative of the positioning of said at least one compartment separator.

4. Locker according to claim 1, wherein said at least one compartment separator can be manually positioned by a user equipped with a communication device enabling a manual inputting of informations representative of the positioning of said at least one compartment separator, the communication device being capable of transmitting these informations to the control module.

5. Locker according to claim 1, characterized in that the electronic locks comprise a movement sensor capable of detecting a closing of the door and a data transceiver capable of emitting a detecting signal for signaling the detection of closing of the door on the datalink, and in that the control module is further configured to:
generate digital keys including a unique digital key following the detection of closing of the door,
transmit the unique digital key generated to the electronic recognition component, the electronic recognition component being able to authenticate the received digital key by comparing with the generated digital key;
emit a signal comprising the unique digital key generated.

6. Locker according to claim 5, wherein, when said at least one compartment separator is positioned in the second position, the control module is configured to generate a unique digital key for all the electronic locks associated with the doors which form access to the compartments arranged on either side of said at least one compartment separator, the unique digital key being generated only when the closing of all doors which form access to the compartments arranged on either side of said at least one compartment separator is detected.

7. Locker according to claim 1, further comprising:
a memory capable of storing digital keys, at least one digital key being associated with each electronic lock, and
wherein the control module is further configured to transmit said at least one stored digital key to the electronic recognition component, the electronic recognition component being able to authenticating said at least one received digital key by comparing with said at least one stored digital key.

8. Locker according to claim 5, characterized in that a timestamp is associated with the unique digital key, and in that the electronic recognition component is only able to authenticating the received digital key by comparing with the unique digital key generated for a predetermined duration.

9. A vehicle comprising a locker according to claim 1.

10. A furniture unit comprising a locker according to claim 1.

11. A method for locking and unlocking at least two doors of a locker, the method comprising:
a step of receiving, by a control module of a locker, a signal comprising at least one digital key, wherein the locker comprises:
at least two compartments each defining an internal space for receiving an object;
at least one compartment separator arranged between two compartments and which could be positioned;
in a first position, so as to separate the respective internal spaces defined by these compartments, or
in a second position, so as to assemble the respective internal spaces defined by these compartments;
at least two doors, each door forming access to a separate compartment from the outside of the locker, each door comprising an electronic lock and being capable of closing one of said internal spaces; and
the control module linked to the electronic locks via a datalink, the electronic locks being capable of locking and unlocking the door according to the value of an instruction received by the electronic locks via the first datalink, the control module comprising,
a sensor capable of receiving said signal comprising at least one digital key; and
an electronic recognition component comprising a memory and a processor capable of authenticating said at least one received digital key,
the sensor being capable of transmitting the signal to the electronic recognition component, the authentication of said at least one received digital key by the electronic recognition component triggering the generation of an instruction signal for the locking or unlocking of the door, characterized in that,
the control module is configured to determine if the at least one compartment separator is positioned in the first or in the second position, and transmit the result of this determination to the electronic recognition component and in that,
the electronic recognition component is capable, when it is determined that said at least one compartment separator is positioned in the second position, to transmit, following the authentication of said at least one digital key, said instruction signal to all electronic locks associated with the doors which form access to the compartments arranged on either side of said at least one compartment separator, for the locking or unlocking of said doors;
a step of authenticating said at least one received digital key by the electronic recognition component;
a step of determining, by the control module, if the at least one compartment separator is positioned in the first or in the second position;
a step of transmitting, by the control module, the result of this determination to the electronic recognition component; and
when it is determined that said at least one compartment separator is positioned in the second position, a step of generating by the electronic recognition component, following the authentication of said at least one digital key, an instruction signal for all the electronic locks associated with the doors, which form access to the compartments arranged on either side of said at least one compartment separator, for the locking or unlocking of said doors.

* * * * *